US008761602B2

(12) United States Patent
Caird et al.

(10) Patent No.: US 8,761,602 B2
(45) Date of Patent: Jun. 24, 2014

(54) VIDEO OVER ETHERNET BANDWIDTH OPTIMIZATION

(75) Inventors: Ross Caird, Kanata (CA); Michael Watford, Kanata (CA); David Diep, Kanata (CA)

(73) Assignee: Ciena Corporation, Hanover, MD (US)

( * ) Notice: Subject to any disclaimer, the term of this patent is extended or adjusted under 35 U.S.C. 154(b) by 367 days.

(21) Appl. No.: 13/190,218

(22) Filed: Jul. 25, 2011

(65) Prior Publication Data

US 2013/0028601 A1 Jan. 31, 2013

(51) Int. Cl.
H04J 14/00 (2006.01)
H04L 1/00 (2006.01)

(52) U.S. Cl.
USPC ............ 398/58; 398/43; 370/235; 370/404; 370/218; 370/400; 370/255

(58) Field of Classification Search
USPC ............. 398/58, 43; 370/235, 404, 395.53
See application file for complete search history.

(56) References Cited

U.S. PATENT DOCUMENTS

| 6,466,343 | B1 * | 10/2002 | Lahat et al. | 398/82 |
|---|---|---|---|---|
| 2006/0056425 | A1 * | 3/2006 | Wu et al. | 370/401 |
| 2007/0058629 | A1 * | 3/2007 | Luft | 370/390 |
| 2007/0168523 | A1 * | 7/2007 | Jiang et al. | 709/228 |
| 2008/0080537 | A1 * | 4/2008 | Wan et al. | 370/401 |
| 2008/0271096 | A1 * | 10/2008 | Gazier et al. | 725/100 |

* cited by examiner

Primary Examiner — David Payne
(74) Attorney, Agent, or Firm — Muncy, Geissler, Olds & Lowe, P.C.

(57) ABSTRACT

Methods and apparatuses for controlling the flow of video over Ethernet (VoE) traffic in a network are disclosed. The method can include originating the VoE traffic from an add node in the network. A first control signal can be received from a first drop node in the network containing a drop port configured to receive the VoE traffic. The add node can determined if the first drop node contains the drop port based on the first control signal.

18 Claims, 15 Drawing Sheets

(reference network)

(Multicast VoE)

(Multicast VoE with multiple Drop Nodes and multiple Drop Ports)

(One Add Port with no Drop Ports)

(One Drop Port added to the network)

(Add Node identifies one Drop Node and modifies MAC DA of VoE traffic to Unicast Station Address of Drop Node)

(Additional Drop Port added to the network with Add Port Identifying the presence of multiple Drop Ports. Add Node switches back to Multicast DA in VoE traffic)

(Network reverts to single Drop Port – Add Node switches back to Unicast DA but with Station Address of Node C).

(second embodiment initial state with Multicast VoE traffic flowing to and past lone drop node)

(second embodiment with Add Node A detecting 1 Drop Node and advertising the 1 listener)

(lone Drop Node detects the advertised listener count and blocks the traffic from egressing the lines since it is the only Drop Node)

(second embodiment – Additional Drop Port added to the network which advertises its presence back to the Add Node)

(second embodiment – Add node advertises multiple listeners and Node B removes its egress blocks on its line ports so that the VoE traffic now flows to and through the Node B to Node C)

(second embodiment - linear configuration with one Drop Port)

VIDEO OVER ETHERNET BANDWIDTH OPTIMIZATION

BACKGROUND OF THE INVENTION

1. Field of the Invention

The present disclosure is related to network communications and more specifically to Video over Ethernet transport in provider networks.

2. Description of the Related Art

The technology of Video over Ethernet (VoE) is affected by and limited by the ability to separate video from standard Ethernet traffic in a reliable manner. Previous iterations of Video over Ethernet required higher layer protocols. That is, layer 2 (Data Link Layer) was not used as a method of segregating Video traffic from standard Ethernet traffic. Because video data flows unidirectionally and at a constant bit rate, any errors which occur during transmission as well as discards due to network congestion are not able to be tolerated. Accordingly, extreme care is necessary in the planning of the network in order to avoid oversubscription with other Ethernet traffic which can trigger network discards and cause video interruptions. The unidirectional nature of the traffic and the necessity to often drop and continue the flows require multicasting of VoE frames from one "add" site to multiple 'drop" locations requiring a multicast address (Destination Address (DA)) in order to steer traffic around a network. This process however causes inefficiencies in the use of network bandwidth because the traffic may flow to as well as through their intended destinations. In still other applications a unicast of the VoE frames from a single "add" site to a single "drop" site within a network is necessary or desirable. The difficulty is the ability to determine when to switch between multicast or unicast and how to accomplish this switching.

Thus the existing methods of transportation of Video over Ethernet through Ethernet switches using a multicast Destination Address provides inefficient bandwidth use and conversely using only unicast Destination Addresses restricts the usefulness because it inherently removes the drop and continue functionality. Additionally switching between the multicast and unicast mode in existing systems requires manual intervention making it impractical and certainly more difficult to implement on a regular basis.

There is thus a need to provide an automatic mechanism to determine the nature of the required destination address DA (unicast or multicast) and whether the traffic was discard eligible due to the number of destination locations.

SUMMARY

The various embodiments disclosed relate to automatically determining the VoE traffic flow for a provider network and to implement either a unicast or multicast mode based on that determination.

Accordingly, an embodiment can include a method for controlling the flow of video over Ethernet (VoE) traffic in a network, the method comprising: originating the VoE traffic from an add node in the network; receiving a first control signal from a first drop node in the network containing a drop port configured to receive the VoE traffic; and determining if the first drop node contains the drop port based on the first control signal.

Another embodiment can include a method for controlling the flow of video over Ethernet (VoE) traffic in a network, the method comprising: receiving the VoE traffic at a first drop node from an add node in the network; determining if the first drop node contains a drop port; and transmitting a first control signal from the first drop node indicating the first drop node contains a drop port.

Another embodiment can include an apparatus for controlling the flow of video over Ethernet (VoE) data in a network, the method comprising: means for originating the VoE data from an add node in the network; means for receiving a first control signal from a first drop node in the network containing a drop port configured to receive the VoE data; and means for determining if the first drop node contains the drop port based on the first control signal.

Another embodiment can include a non-transitory computer readable medium embodying computer executable instructions for controlling the flow of video over Ethernet (VoE) traffic in a network, the non-transitory computer readable comprising: instructions to receive the VoE traffic at a first drop node from an add node in the network; instructions to determine if the first drop node contains a drop port; and instructions to transmit a first control signal from the first drop node indicating the first drop node contains a drop port.

Further scope of applicability of the present invention will become apparent from the detailed description given hereinafter. However, it should be understood that the detailed description and specific examples, while indicating various embodiments of the invention, are given by way of illustration only, since various changes and modifications within the spirit and scope of the invention will become apparent to those skilled in the art from this detailed description.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which:

FIG. 15 is a flowchart illustrating a method of at least one embodiment; and.

DETAILED DESCRIPTION

Figure 1:
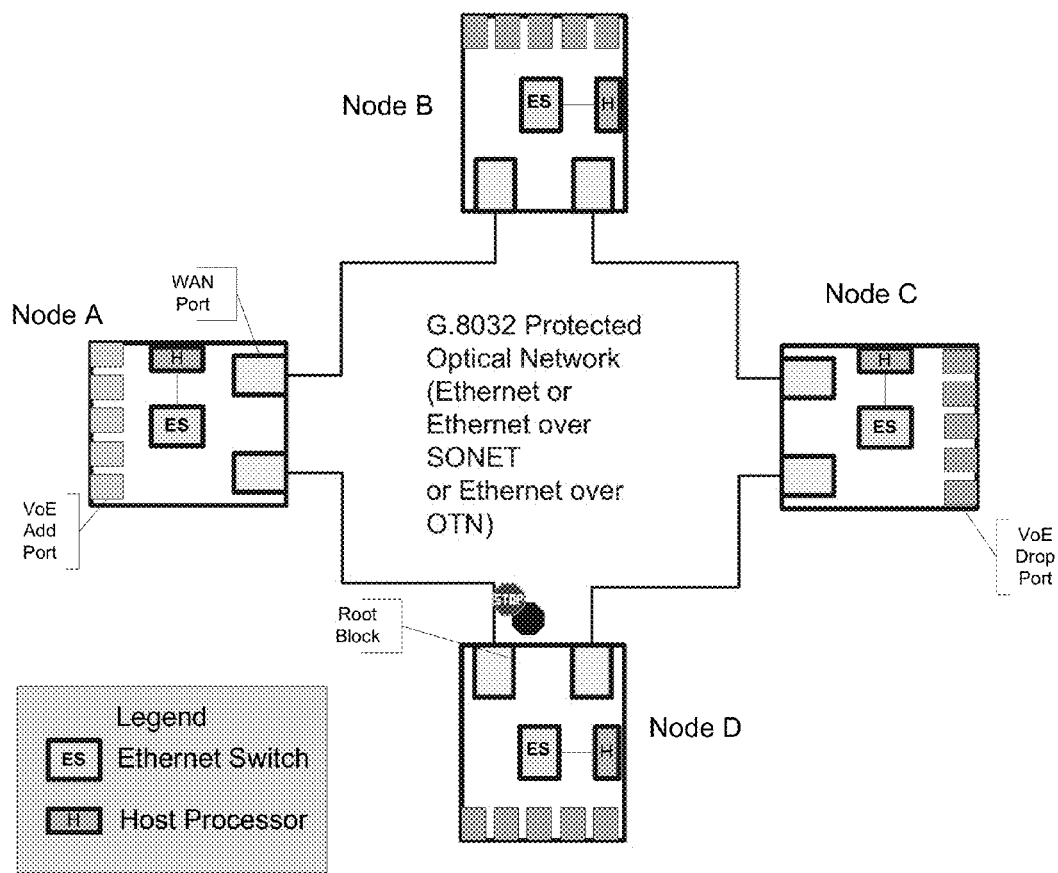
FIG. 1 is a schematic of a reference network exemplifying the type of network where the present invention could be used.

The various embodiments of the invention are described hereinafter with reference to the accompanying drawings, in which embodiments of the invention are shown. However, the various embodiments may be embodied in many different forms and should not be construed as limited to the embodiments set forth herein. Rather, these embodiments are provided to illustrate various aspects of the invention.

Aspects of embodiments of the invention are disclosed in the following description and related drawings directed to specific embodiments of the invention. Alternate embodiments may be devised without departing from the scope of the invention. Additionally, well known elements of the invention will not be described in detail or will be omitted so as not to obscure the relevant details of embodiments of the invention. The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of non-transitory computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

In the following, various aspects for automatically reconfiguring Video over Ethernet (VoE) traffic for improved network bandwidth are described. The VoE traffic is used based on the number of destination locations (drop nodes). The Destination Address (unicast or multicast) is dynamically altered by using control frames, Media Access Control learning and Static Forwarding Database Entries within Ethernet switches. Alternatively the Destination Address may remain multicast by having a listener/drop count given to the nodes within the network and having listener/drop nodes take dynamic action to limit the multicast flow from passing through a node containing the sole listener/drop port within the network.

At least one aspect relates to automatically determining the nature of a Destination Address for a provider network and to implement either a unicast or multicast mode based on that determination.

Another aspect relates to using control frames from each "drop" site to be sent back to an "add" site to identify the "drop" sites requiring reception of VoE traffic flow.

Another aspect relates to marking the data flow of Ethernet Frames as eligible for discard at the "add" node until at least one "drop" is identified back at the "add" node.

Another aspect relates to causing the control frames sent from the "drop" node back to the "add" node to initiate Ethernet Media Access Control (MAC) learning to occur at all intermediate switches along the route from the "drop" node back to the "add" node.

These and other aspects can be accomplished by the methods and apparatuses in which Ethernet control frames sent from a Network element VoE "drop" node back to the VoE "add" node function to identify the drop port and the number of drop ports desiring reception while causing learning to occur at all intermediate switches along the route back to the VoE "add" node. Additionally the invention marks the Ethernet Frames as Discard Eligible at the "add" node until at least one "drop" node identifies itself back at the "add" node. Still further the invention marks the flow of Ethernet Frames as Discard Eligible at the "add" node based on the reception of a Remote Defect Indication from the "drop" node should congestion or other problems in the network show the data path to the "drop" port is not usable. Alternatively, in a further embodiment the Destination Address (DA) need not be modified dynamically and may remain a multicast address throughout by using Y.1731 control frame messaging from the "add" port in order to multicast a "listener count" to the other nodes within the network. This requires that drop ports take dynamic action in order to limit the multicast flow of VoE traffic from leaving the drop node.

Figure 2:
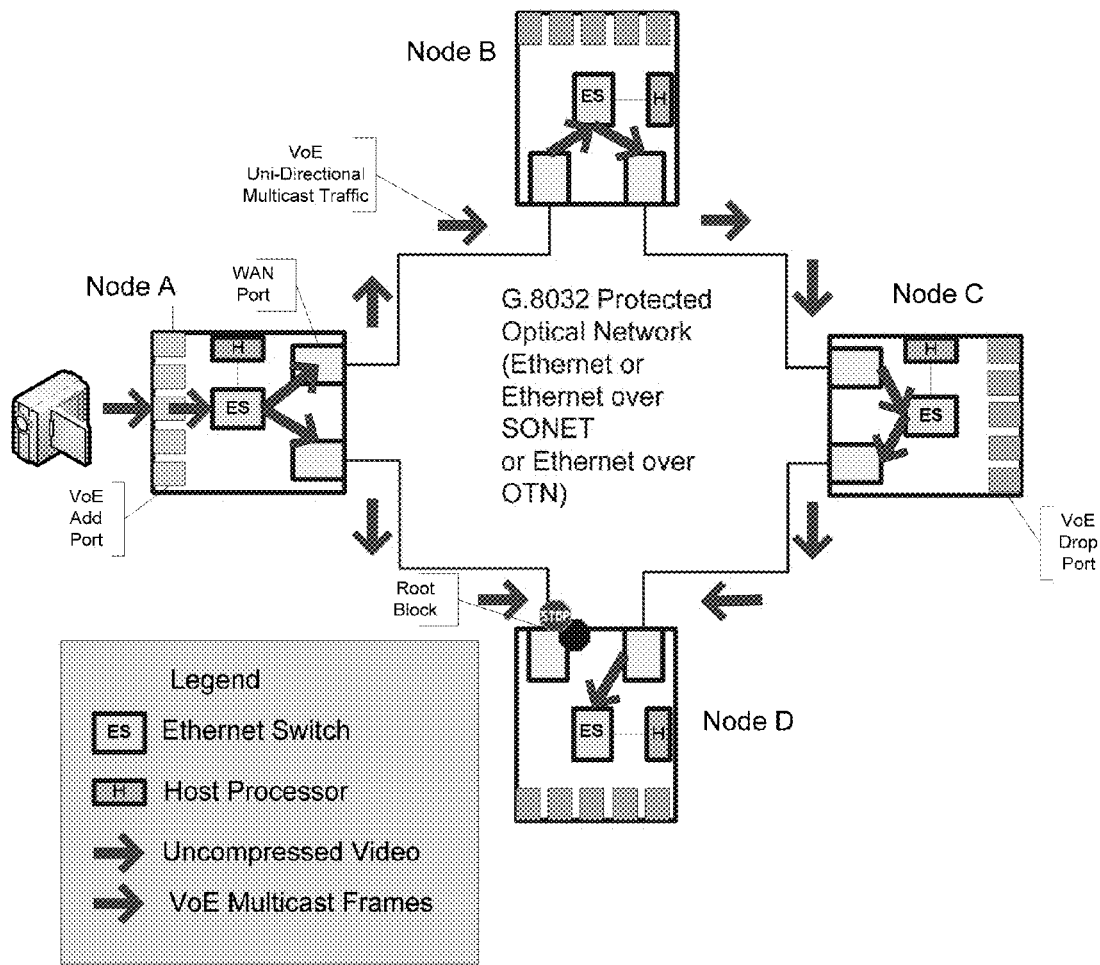
FIG. 2 shows a current method for encapsulating SMPTE (Society of Motion Picture and Television Engineers) SD/HD/3g-SDI standard video traffic on the reference network of FIG. 1.
Figure 3:
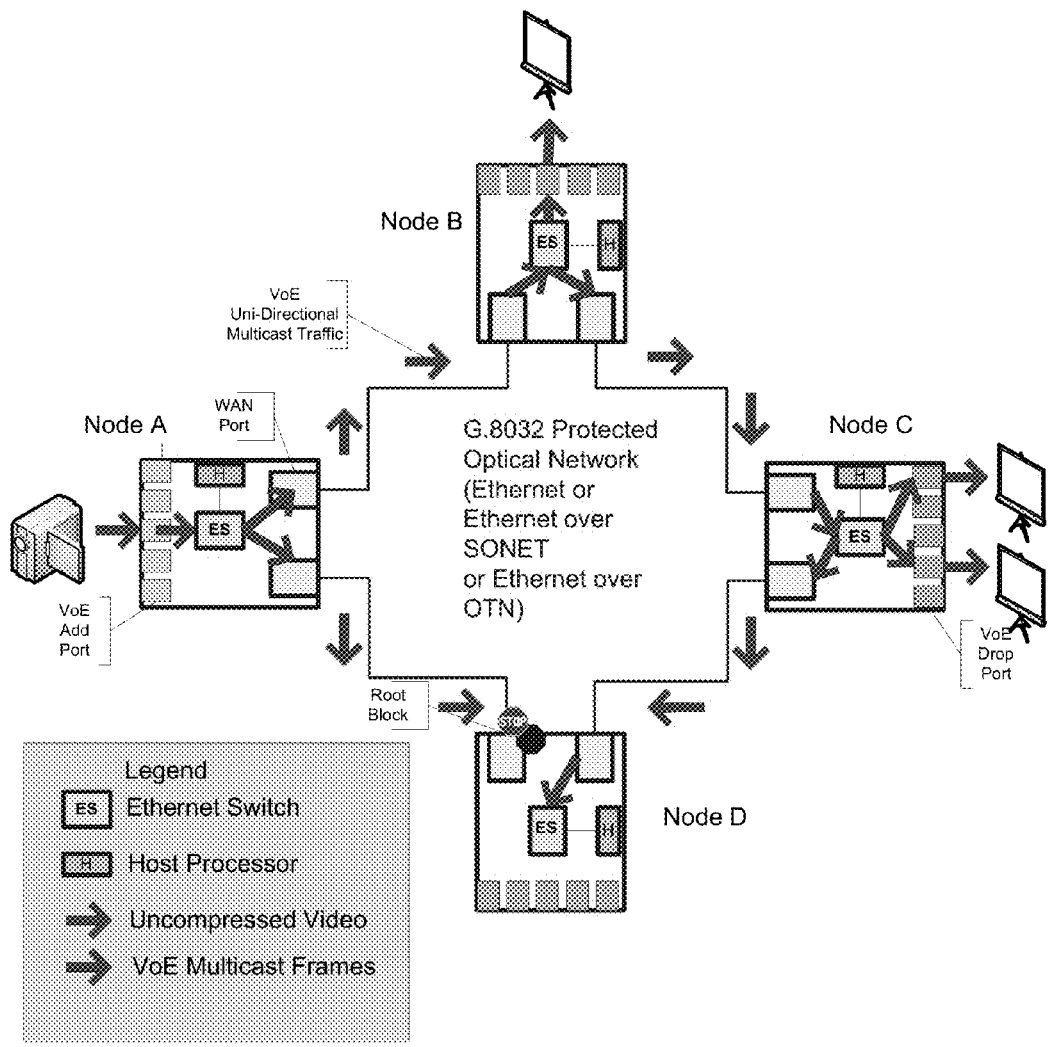
FIG. 3 shows multiple drop ports processing multicast VoE frames.

FIGS. 1-3 illustrate an exemplary environment in which the method of the various embodiments can be practiced. The network illustrated FIG. 1 provides an example of the type of architecture upon which the various embodiments can be implemented to provide the improved Video over Ethernet (VoE) traffic flow. As an illustrative example, four Nodes A, B, C, and D also labeled as 10, 20, 30, 40, each contain an associated Ethernet switch (ES) 11, 21, 31, 41 and a host processor (H) 12, 22, 32, 42 as well as a series of ports 15, 25, 35, 45. Further, each contains two WAN ports 13, 14, 23, 24, 33, 34, 43, 44 for connection to an adjacent node. The connection between Wan 14 and Wan 44 includes a root block. One of the ports 15 of Node A is an add port 151 and one of the ports 35 of Node C is a VoE drop port 351.

The raw video 210 from video source 220 can be encapsulated as SMPTE (Society of Motion Picture and Television Engineers) SD/HD/3g-SDI standard video traffic on the network (VoE traffic) of FIG. 1 is illustrated in FIG. 2 wherein arrows 200 represent VoE unidirectional Multicast Traffic among the Nodes A-D. Ethernet frames, with Q-TAGS for VLAN association, multicasts the traffic into a network so that it is available for any number of drop ports to acquire and transmit externally out of the network. The initial Node A has no knowledge of the existence of any drop ports in the network so that the traffic is multicast throughout the entire network consuming bandwidth the network regardless of whether there are any drop ports (listeners) for the VoE traffic.

FIG. 3 includes within the Nodes B and C the arrows 300 which illustrate multiple drops acquiring the multicast VoE frames and transmitting traffic out of the network to the displays 350, 360 and 370 after removing the Q-TAGS and also removing the Ethernet headers.

The various embodiments allow for improved use of bandwidth within a VoE network or mixed VoE and Ethernet traffic and reduce the provisioning complexity of the network. Generally Ethernet traffic is bi-directional and Ethernet Media Access Control (MAC) learning therefore functions properly. When traffic patterns of Ethernet traffic are unidirectional such as VoE traffic, then traffic from the "drop" ports must be initiated in order to convey the unicast address from the drop port to the add port so that the address of the drop port can be used by the transmit traffic from the add port.

Figure 4:
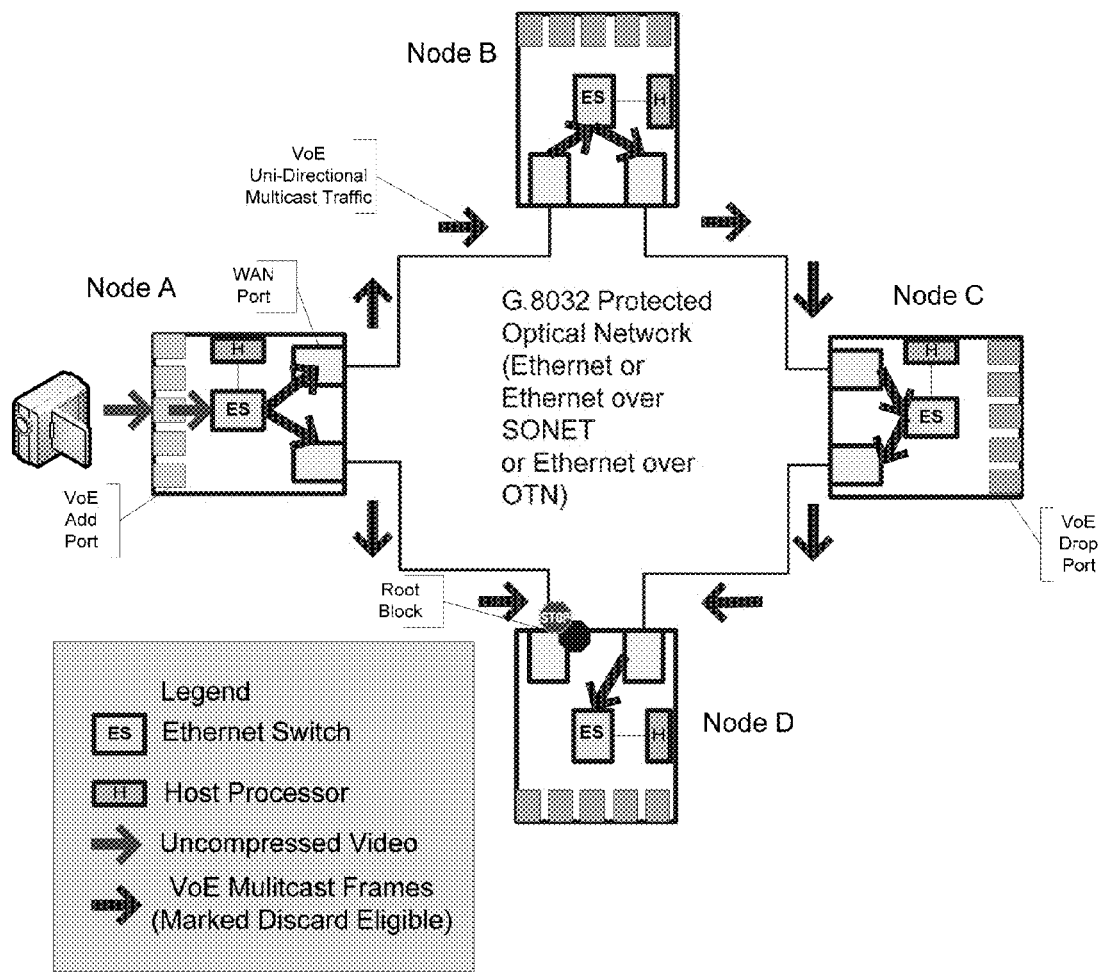
FIG. 4 illustrates an initial state of the network of FIGS. 1-3 with an "add" port enabled when using the present invention.

The implementation of an embodiment in its initial state is illustrated in FIG. 4 with an add port being enabled. The VoE frames remain multicast but the arrows 250 differ from the arrows 200 of FIG. 2 as they are marked Discard Eligible until at least one listener (add node) is identified. This marking allows the Ethernet switches (ES, 11, 21, 31, 41) in the network to discard this traffic when congestion is encountered.

Figure 5:
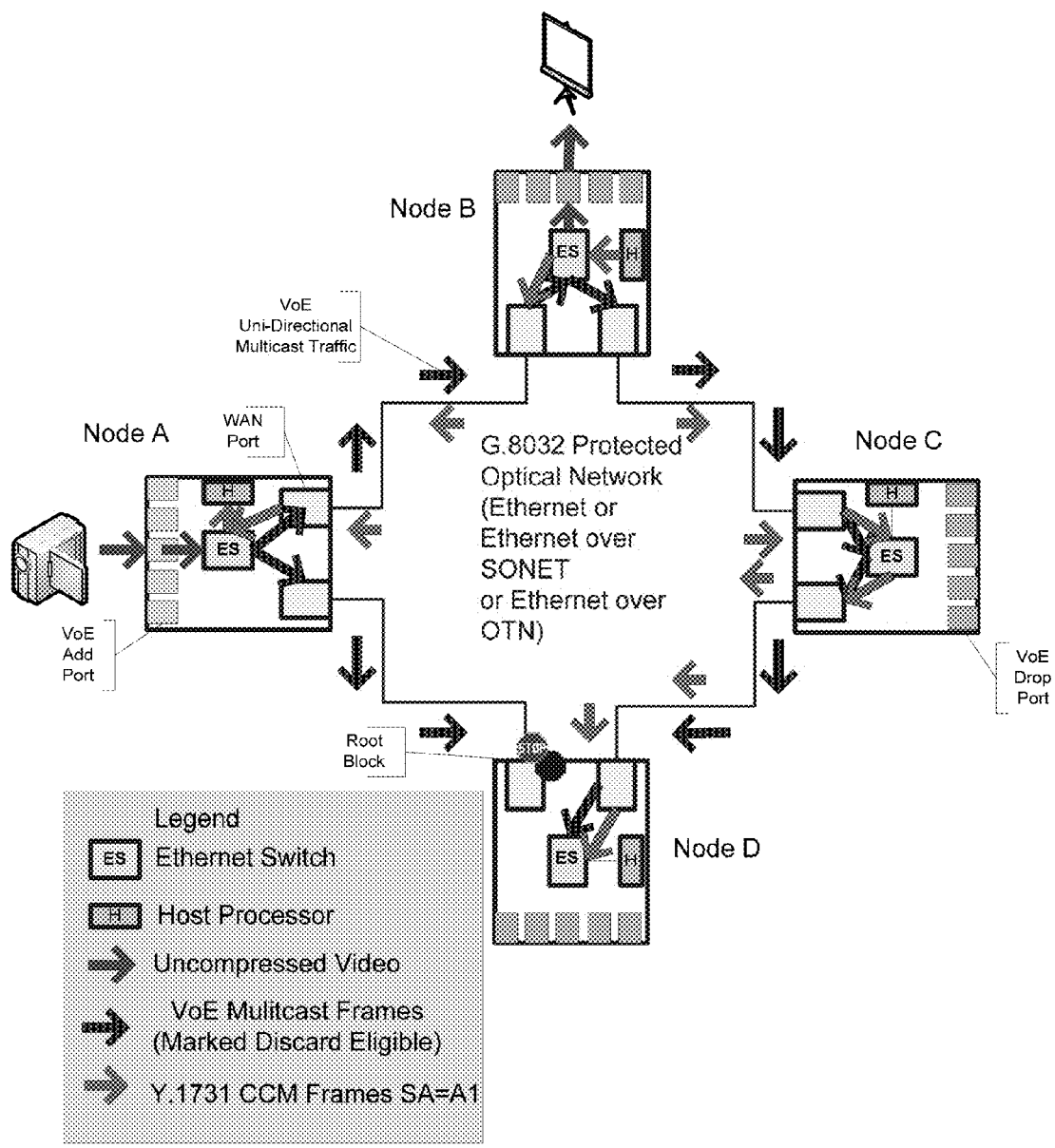
FIG. 5 details the ordering of control frames for indicating the presence of a "drop" port within the network according to the present invention.

According to the various embodiments, in order to indicate the presence of a drop port within the network, control frames, developed based on the standards of Y.1731 for Continuity Check Messages (CCM), are made to originate on the node containing a drop port (Node B) and are detected on the node with an add port (Node A). These Y.1731 CCM control frames are added in FIG. 5 and marked as 400. For example, the Y.1731 frames 400 can be CCM Frames (SA=A1), where SA is a source address and A1 represents a MAC address 1 (unique station address). As can be seen, the arrows point away from Node B (the drop port). These control frames also contain a Source Address which conveys the Station Address of the drop port. The node with the drop port may require a static entry into its Forwarding Database, in order to make the Ethernet switch aware that any Ethernet frames coming into the WAN ports with the Destination Address matching the Station Address of the Video drop port, should be steered to that particular drop port, instead of to the host port which originated the Y.1731 control frames. Optionally, the control frames may have their Remote Defect Indication (RDI) bit set should the system be designed to indicate that the VoE traffic from the add port is not currently being received without errors. Optionally, the Y.1731 control frames may originate from the device external to the drop port on the Ethernet Switch such that the static entry in a forwarding table may not be required.

Figure 6:
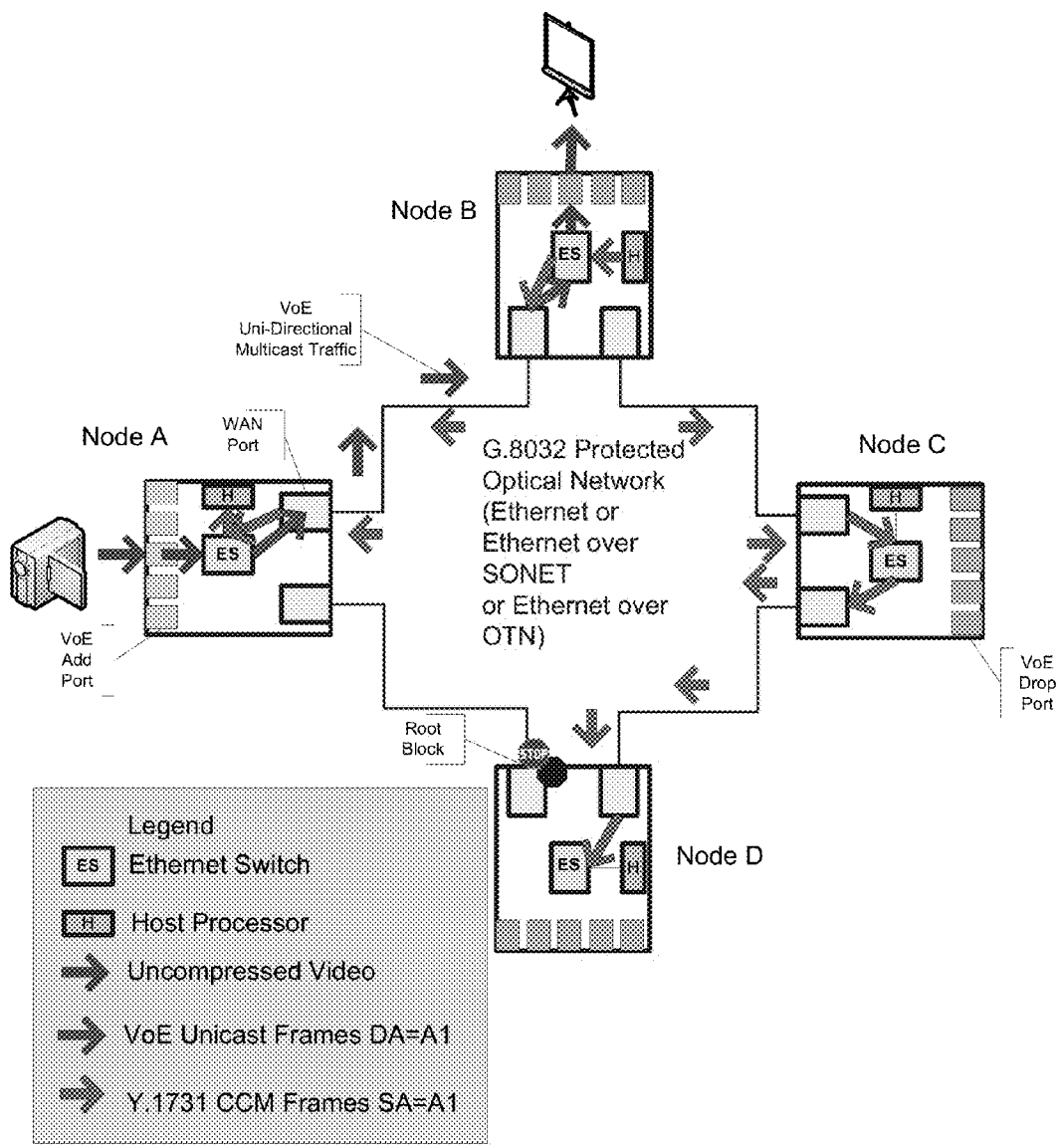
FIG. 6 illustrates the implantation of the present invention to modify VoE traffic to use a unicast address as the Destination Address (DA) for VoE traffic entering the network.

FIG. 6 provides an illustration of how the various embodiments use information derived from the Y.1731 control frames in order to modify the VoE traffic to use a unicast address as the Destination Address (DA) for VoE traffic entering the network (shown by arrows 500 which represent unicast frames). The VoE traffic then is no longer marked as Discard Eligible because it now has at least one "listener" drop port. The Ethernet switches within the network will have learned the path to the drop port, as the Y.1731 control frames traverse the network. The MAC (Media Access Control) allows the VoE frames to only travel on the direct path to the desired individual drop port and will not flood the network with the traffic at points where it is not required. This serves to greatly improve bandwidth utilization at various points in the network. Optionally the add node can maintain the Discard Eligibility of the frames if the RDI (Remote Defect Indication) bit has been set by the far end drop port. If the Discard Eligibility bit is set this provides an indication that there are problems within the network restricting the flow of data from the add port to the drop port so there is no reason to clear the discard eligible (DE) bit at this time. When the DE bit is set, it marks the VoE traffic as less important than the VoE traffic that is already in error free use within the network.

Figure 7:
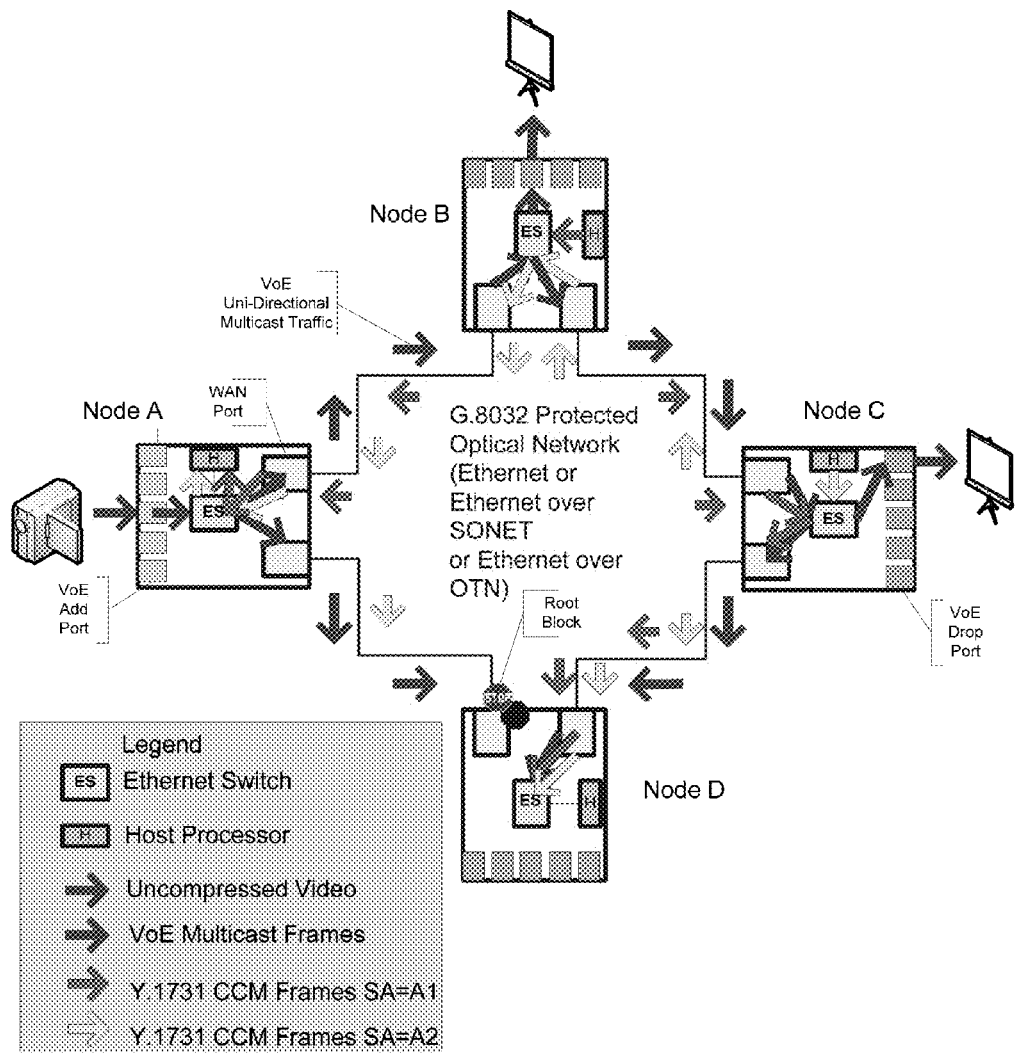
FIG. 7 shows how the present invention is dynamically altered when more than one "drop" port is required.

When more than one "listener" or drop port exists within the network, the dynamic behavior of the various embodiments is illustrated in FIG. 7. Because the node with the add port (Node A) detects two ports (coupled to displays 350 at Node B and 360 at Node C) attempting to listen to the VoE Traffic, the VoE frames will remain non Discard Eligible but will dynamically revert back to being multicast.

Figure 8:
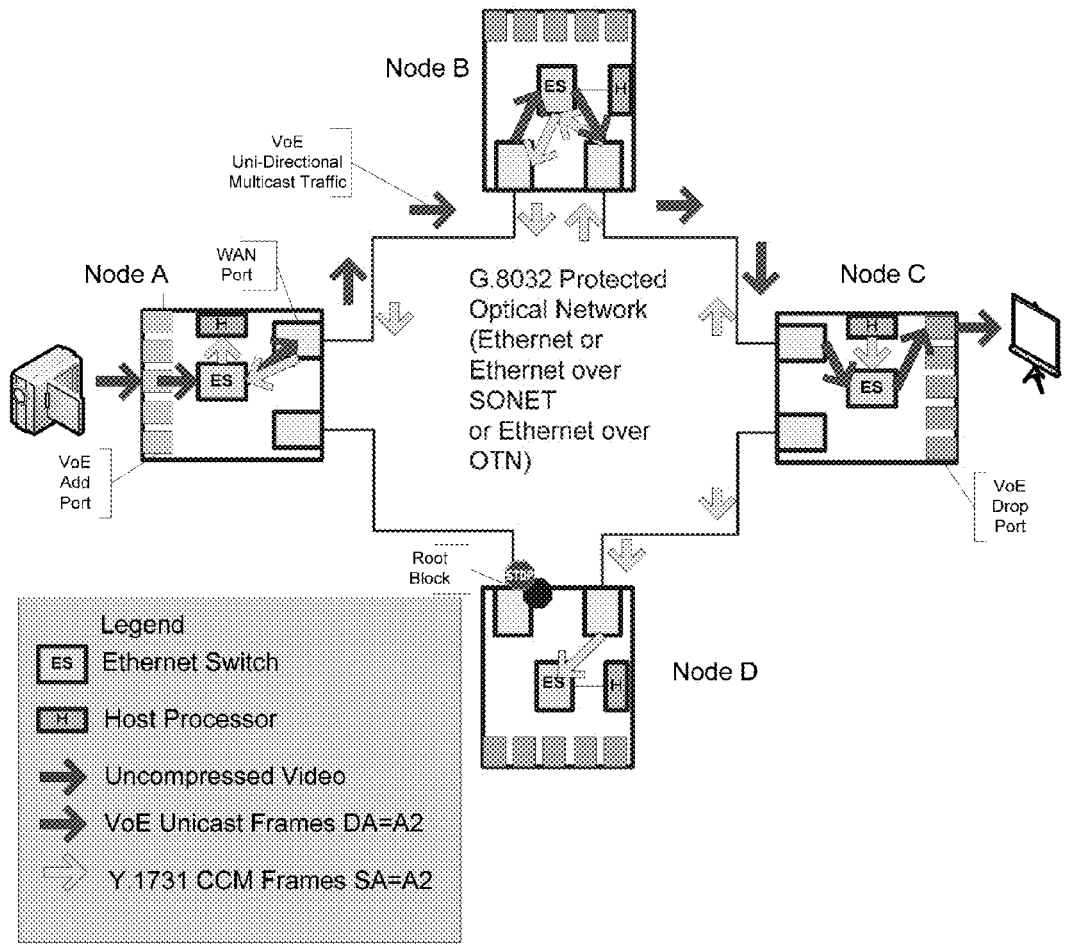
FIG. 8 details, according to the present invention, how the network reverts back to using a specific unicast DA when the number of "drop" ports is again reduced to one.

In the event the number of drop ports (listeners) is reduced back to one (display 360 at Node C) within the network, the various embodiments revert back to a specific unicast Destination Address as shown in FIG. 8. When the node with the Video Add Source (Node A) detects that only one drop port remains via the control frames received (e.g., Node B stopped having a drop port and stopped transmit the control signal), it modifies the MAC DA of the Video Traffic so that it uses the specific unicast Station Address of the lone remaining Drop Port (at Node C). The VoE traffic now flows around the ring from Node A to Node B and through to Node C but does not continue through Node C. Accordingly, the various embodiments can then dynamically restore the efficient bandwidth use which results when the unicast data path is followed.

In the embodiment of FIGS. 1-8, the Destination Address (DA) of the Video over Ethernet (VoE) traffic can be dynamically modified in order to determine unicast (only one drop node) or multicast the traffic (more than one drop node).

Alternate embodiments for achieving dynamic multicasting/unicasting behavior for video over Ethernet traffic are illustrated in FIGS. 9-12 where the Destination Address is not modified dynamically and the Destination Address remains a multicast address throughout the entire operation. More particularly, in order to provide this embodiment one or more Y.1731 control frames are sent from the add port in order to multicast a drop or listener count to the other nodes within the network and the single drop ports take dynamic action for limiting the multicast flow of VoE traffic from egressing the single drop node.

When the node with the Video Add Source (Node A) detects that only one drop port remains, via control frames received, it modifies the advertised listener count, in its forward control frames, so that it indicates only one listener or Drop Node. The Drop Node then detects the listener count of 1 and dynamically blocks the traffic from egressing the network ports of the Drop Node. The traffic is blocked from egressing both line ports, since traffic may flow in either direction around the ring (at the discretion of the G.8032 Shared Ring protection protocol).

Figure 9:
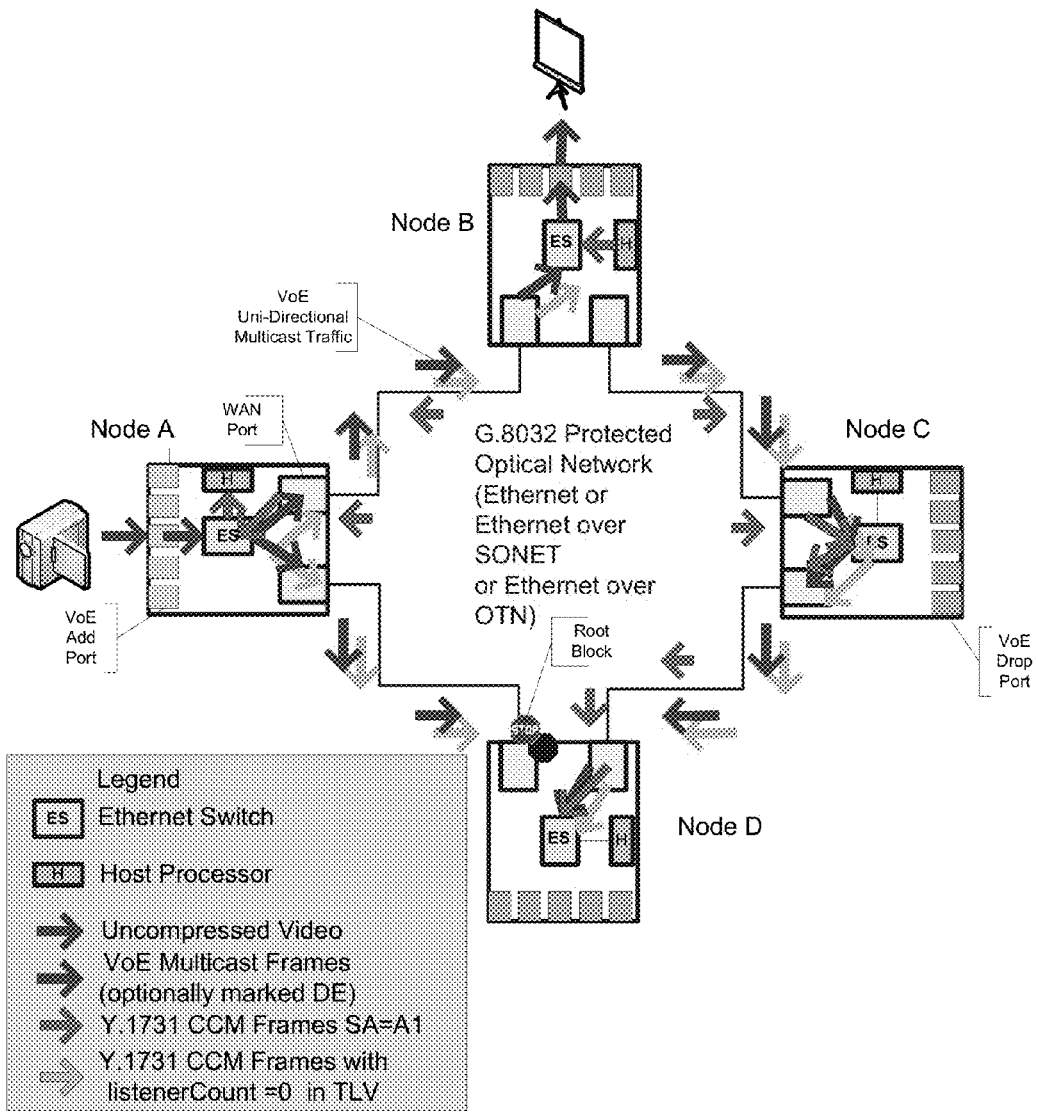
FIG. 9 is a representation of the network with one VoE add port and a single "drop" port use with another embodiment.

In addition to multicast traffic from the add port FIG. 9 illustrates the Y.1731 frames being sent to the remaining nodes including the single drop Node B. At this stage the add node is not aware of the single drop node so the Y.1731 frames have a "listener count=0" indicating that no listeners or drop ports are enabled. Thus the VoE add traffic is available for dropping at any node. The VoE traffic 520 may be marked Discard Eligible (DE). In order to provide the "listener count"

to the network, the add port sends a separate flow of Y.1731 frames 575 containing a TLV (time-length-value) attribute. For example, the Y.1731 frames 575 can be CCM Frames with listener count=0 in TLV. Subsequently, in order to activate the drop Node B, the Node B will need to multicast Y.1731 frames 550 back to the add node (Node A) indicating the desire to drop the VoE traffic 520 so that the node can begin to drop the VoE traffic. For example, the Y.1731 frames 550 can be CCM Frames (SA=A1). FIG. 9, for purposes of clarity, only labels the Y.1731 frames from the add node 575 and from the drop node 550 with the other elements and flow patterns remaining identified as in FIGS. 1-8.

Figure 10:
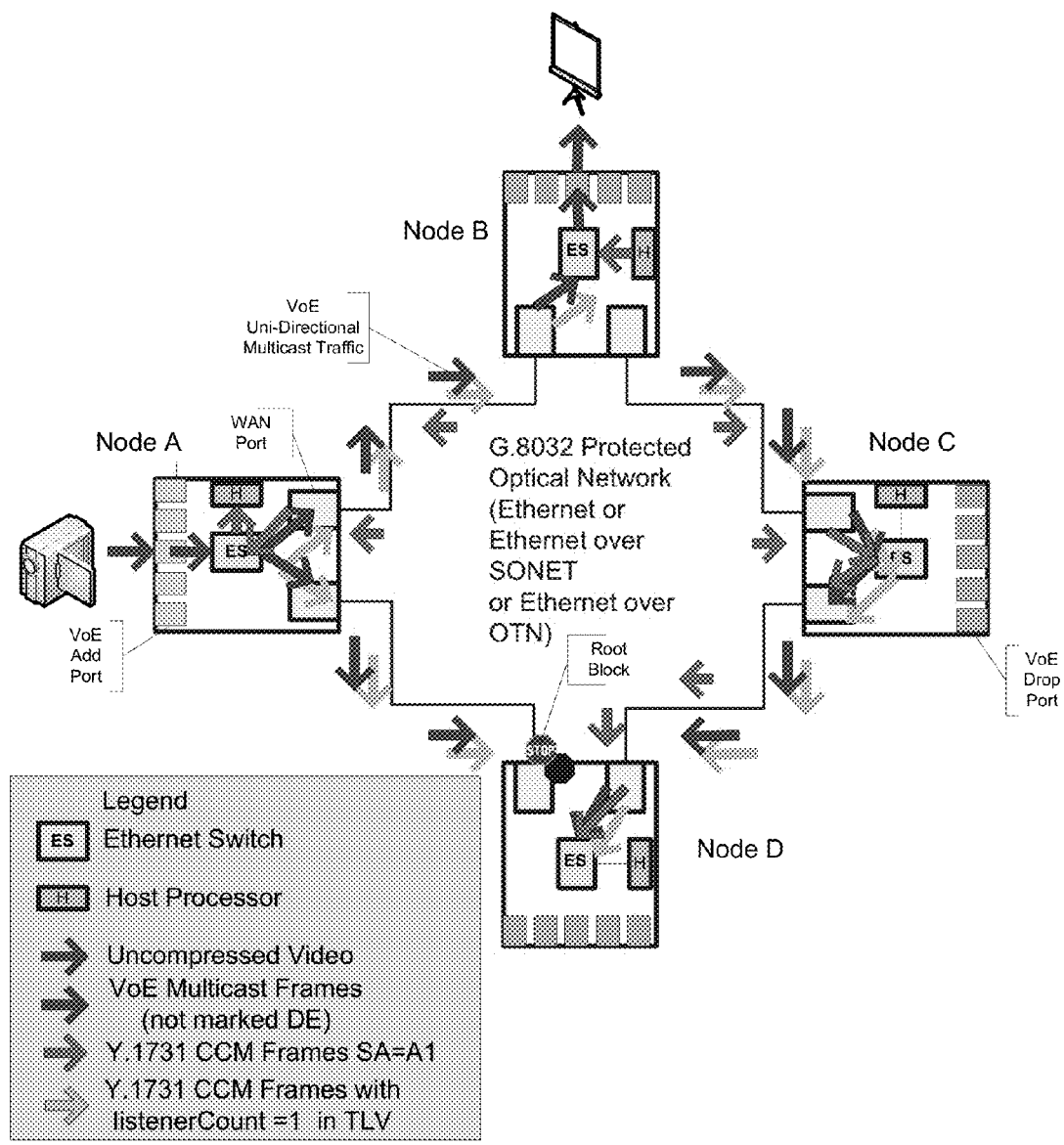
FIG. 10 illustrates the identification of the presence of the "drop" port according to the additional embodiment.

FIG. 10 illustrates the add node identifying the presence of the single drop port which causes the Y.1731 frames sent from the add port to increase the "listener count to 1". For example, the Y.1731 frames 576 can be CCM Frames with listener count=1 in TLV. The signal frames 576 of FIG. 10 are labeled differently than the signal frames 575 of FIG. 9 to reflect the difference in "listener count" between the "0" count of FIG. 9 and the "1" count of FIG. 10.

Figure 11:
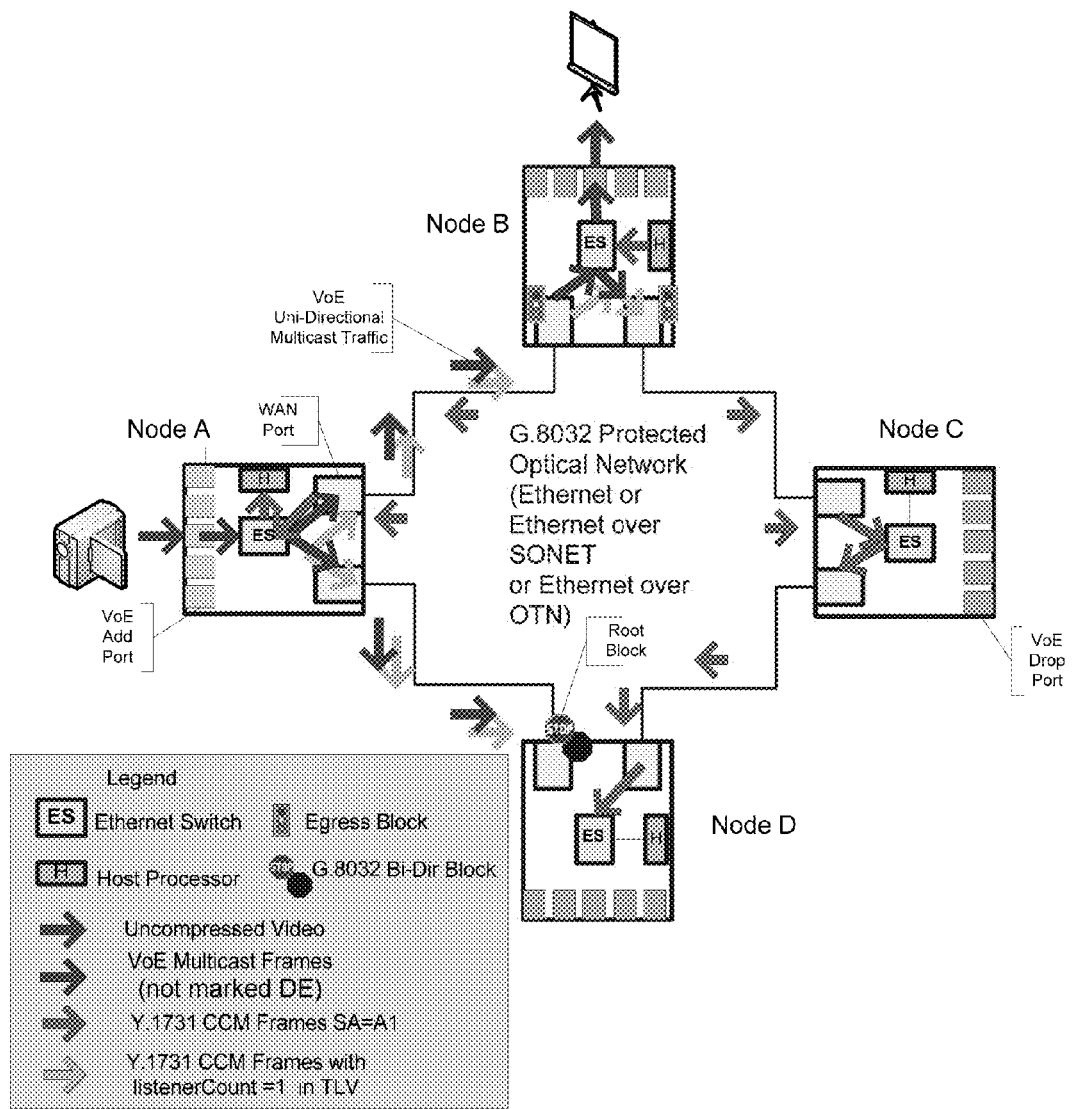
FIG. 11 details the network having blocked traffic at the "drop" port.

In response to the signal frames 576, the drop Node B provides egress blocks 28 so that the flow of VoE traffic 520 does not leave Node B as shown in FIG. 11 wherein signals 576 enter Node B but do not continue to the Nodes C and D. It will be appreciated that two egress blocks 28 are illustrated, since it is possible that the VoE multicast traffic could be traveling in either direction around the network, so the egress beyond the drop node (Node B in this illustration) would be blocked regardless of the direction of the VoE traffic. It is noted that although the blockage by Node B applies to the VoE multicast traffic, it in no way interferes with the dynamic bi-directional blocks controlled by the network (e.g., a G.8032 protected optical network including Ethernet, Ethernet over SONET or Ethernet over OTN).

Figure 12:
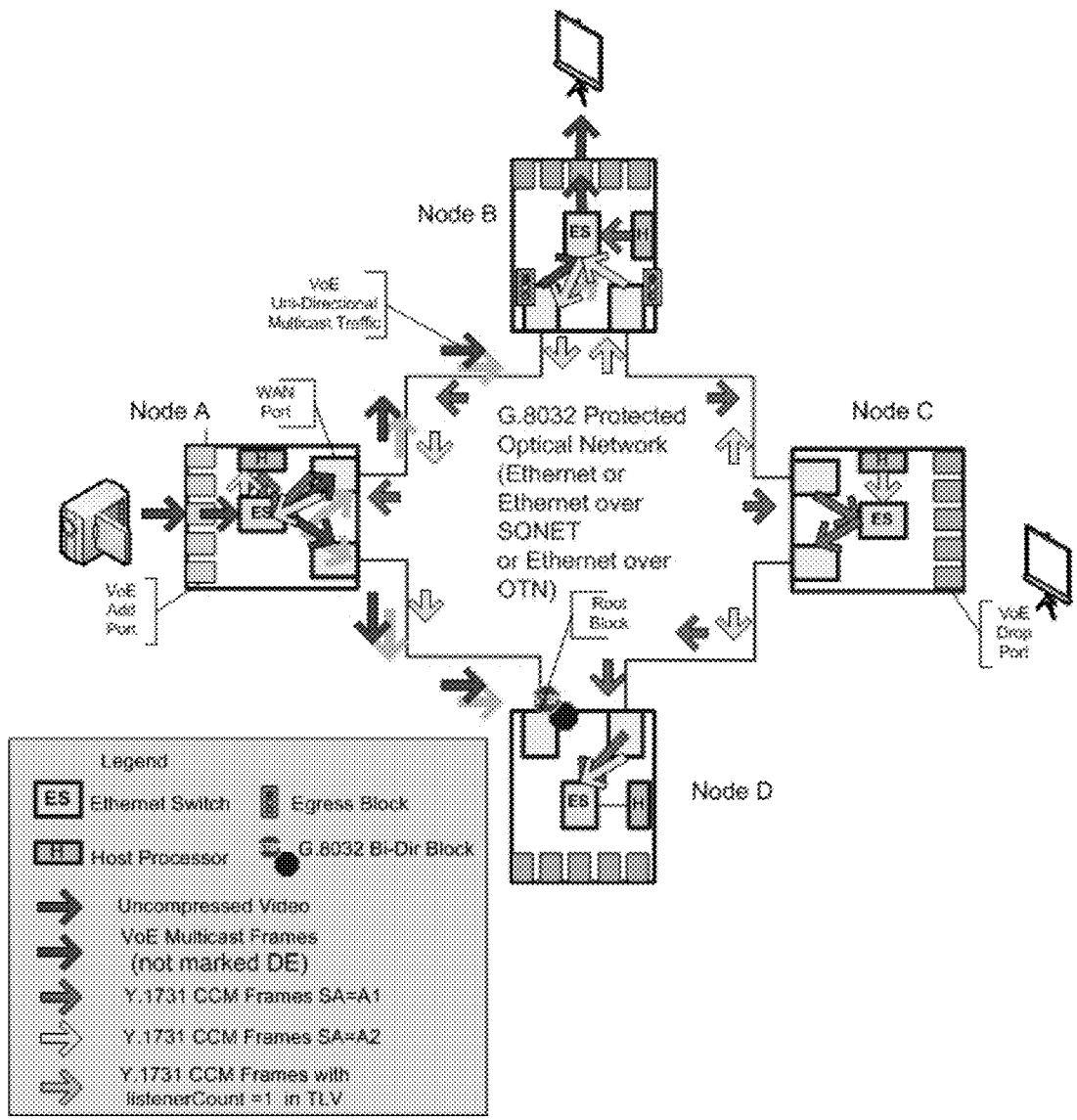
FIG. 12 shows the network with the addition of a second "drop" port.

FIG. 12 illustrates the addition of a second drop Node C. The Node C can multicast Y.1731 frames 560 back to the add Node A indicating the desire to also drop the VoE traffic. In response add Node A identifies the presence of more than one drop node causing the listener count to increase to 2 as indicated by signal 577. For example, the Y.1731 frames 550 can be CCM Frames (SA=A1), the Y.1731 frames 560 can be CCM Frames (SA=A2), where A2 represents a MAC address 2 (unique station address), and the Y.1731 frames 577 can be CCM Frames with listener count=2 in TLV.

Figure 13:
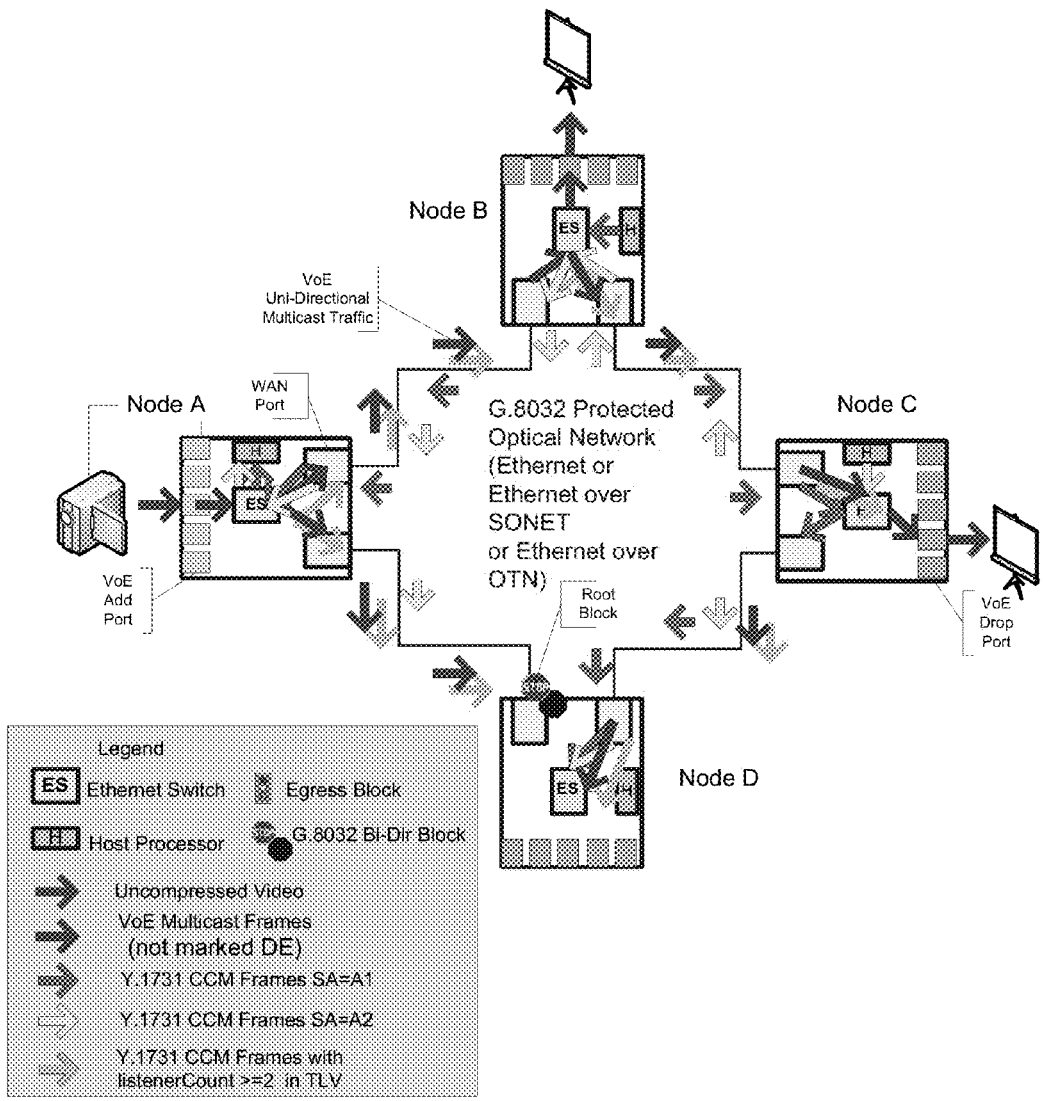
FIG. 13 details the action of the drop port after the addition of the second "drop" port.

In response to the additional "drop" Node C, the "original" single Node B removes the egress blocks because there are now multiple "drop" ports. This removal of egress blockage allows the VoE traffic 520 to continue through Node B to the Node C and on as indicated in FIG. 13. In an alternative embodiment, egress blocks (such as discussed in relation to FIG. 12) could be added to a last drop node in the network (in this case Node C), which would then block the VoE traffic 530 from the remaining nodes in the network (e.g., Node D in this case). The nodes can determine which is the last drop node, for example, by counting the number of hops and advertising the hop count from each drop node, since the VoE traffic is unidirectional. The last drop node would be the drop node having the greatest number of hops. It will be appreciated that although only two drop nodes are illustrated the various embodiments of the invention are not limit to only two drop ports and the teaching provided herein can easily be expanded to any number of drop nodes.

FIGS. 1-13 illustrate embodiments being used in a protected ring configuration. With this type of network the G.8032 Protected Optical Network (Ethernet or Ethernet over SONET or Ethernet over OTN protocol) can add or remove the root block depending on conditions within the network. The G.8032 protocol can cause all Ethernet switches to flush their dynamic Forwarding Database entries when the root block are dynamically added or removed such that the Ethernet Switches within the network relearn data paths within the network.

Figure 14:
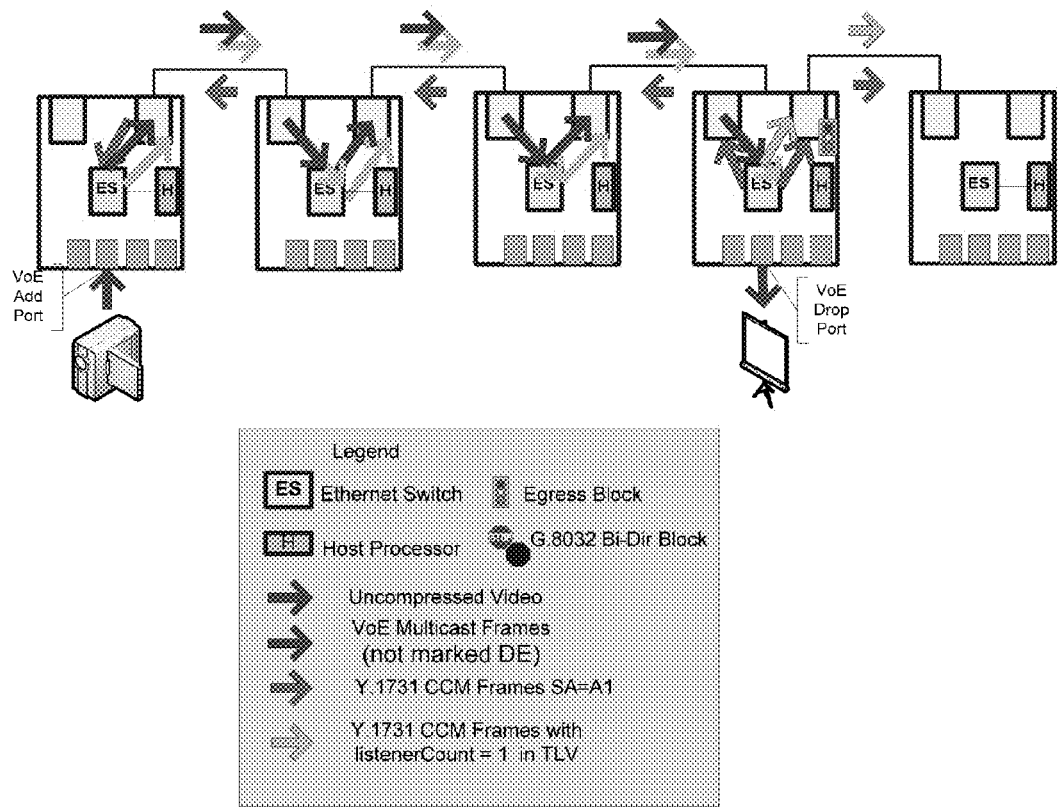
FIG. 14 illustrates the use of the embodiments in a linear network configuration.

Alternately embodiments may be used in linear configurations having, for example, Nodes A-E as illustrated in FIG. 14. As illustrated, the video source provides uncompressed video to an add port on Node A. The VoE traffic 1420 and a separate flow of Y.1731 frames 1475 containing a TLV (time-length-value) attribute can be propagated from Node A to Nodes B, C, and D. As discussed above, in order to activate the drop Node D, the Node D will need to multicast Y.1731 frames 1450 back to the add node (Node A) indicating the desire to drop the VoE traffic 1420 so that the node can begin to drop the VoE traffic 1420 at Node D to display 1460. For example, the Y.1731 frames 1450 can be CCM Frames (SA=A1). Finally, an egress block 1428 can be provided in Node D so that if the flow of VoE traffic is not used it does not go on to additional nodes. Accordingly, in this illustration, Node E does not revive the VoE traffic.

Using the various embodiments, the automatic conversion between unicast mode and multicast mode allows for simplicity of implementation and provisioning. Another benefit of the present invention is the efficient use of network bandwidth within the network because the unidirectional VoE traffic will only take one path to drop ports in point to point applications. Further the present invention automatically prevents unused VoE from congesting the flow of traffic through the use of Destination Address (DA) bit marking of unused traffic and clearing of the DE bit marking for traffic in use.

Figure 15:
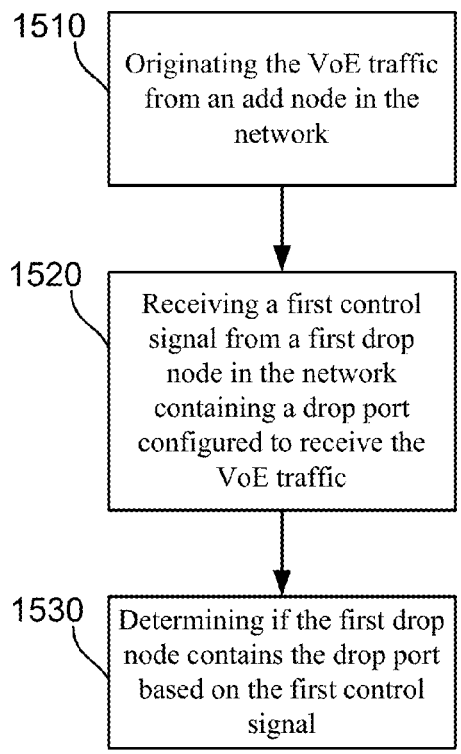

In view of the foregoing it will be appreciated that the embodiments include methods, sequences and/or algorithms as disclosed herein. For example, referring to FIG. 15, an embodiment including a method may be illustrated in a flowchart. The method for controlling the flow of video over Ethernet (VoE) traffic in a network, includes originating the VoE traffic from an add node in the network, 1510. A first control signal is received from a first drop node in the network containing a drop port configured to receive the VoE traffic, 1520. The determination if first drop node contains the drop port can be made based on the first control signal, 1530.

Figure 16:
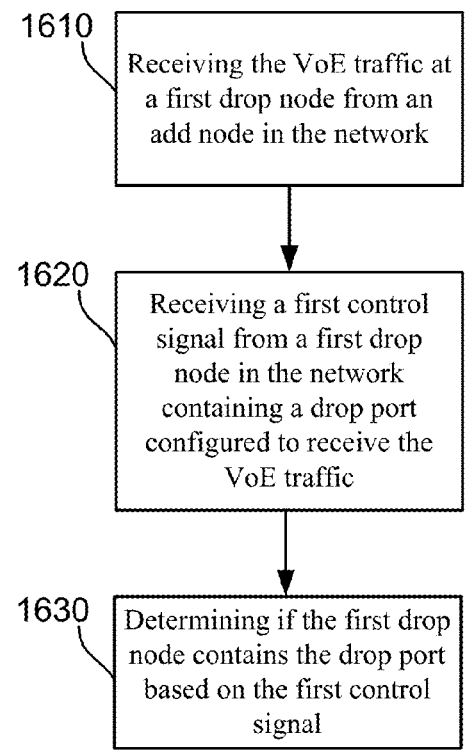
FIG. 16 is a flowchart illustrating a method of at least one embodiment.

Referring to FIG. 16, another aspect from one of the receiving nodes is illustrated. A method for controlling the flow of video over Ethernet (VoE) traffic in a network, the method includes receiving the VoE traffic at a first drop node from an add node in the network, 1610. A determination can be made if the first drop node contains a drop port, 1620. Then, a first control signal is transmitted from the first drop node indicating the first drop node contains a drop port, 1630.

As discussed herein the control signal can be compliant with the standards of Y.1731 for Continuity Check Messages (CCM) and these control frames have been generally used for consistency of illustration and discussion in the foregoing, but the various embodiments of the invention are not limited to these specific control frames. Likewise, the configuration and arrangement of the network and nodes are provided for illustration purposes only and the various embodiments of the invention are not limited to these specific elements or arrangements illustrated.

It will be appreciated that the methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, various embodiments of the invention can include a computer readable media embodying a method for controlling the flow of video over Ethernet (VoE) traffic in a network. Accordingly, the invention is not limited to the illustrated examples and any means for performing the functionality described herein or its known equivalents are included in embodiments of the invention.

While the foregoing disclosure shows illustrative embodiments of the invention, it should be noted that various changes and modifications could be made herein without departing from the scope of embodiments of the invention as defined by the appended claims.

Likewise, the functions, steps and/or actions of the methods in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method for controlling the flow of video over Ethernet (VoE) traffic in a network, the method comprising:
    originating the VoE traffic from an add node in the network;
    transmitting a first control signal from the add node with a listener count of zero;
    receiving at the add node, a second control signal from a first drop node in the network containing a drop port configured to receive the VoE traffic;
    determining if the first drop node contains the drop port based on the second control signal; and
    upon determining that the first drop node contains the drop port, transmitting the first control signal from the add node with a listener count of one.

2. The method of claim 1, further comprising:
    transmitting the VoE traffic as a unicast unidirectional signal in response to the second control signal from the first drop node.

3. The method of claim 1, further comprising:
    receiving a third control signal from a second drop node in the network indicating the second drop node has a drop port configured to receive the VoE traffic; and
    transmitting the VoE traffic as a multicast unidirectional signal in response to the third control signal from the second drop node.

4. The method of claim 3, further comprising:
    detecting a loss of one of the second control signal or third control signal; and
    transmitting the VoE traffic as a unicast unidirectional signal in response to a loss of one of the second control signal or third control signal.

5. The method of claim 1, further comprising:
    marking the VoE traffic as discard eligible when there are no drop nodes determined to be in the network.

6. The method of claim 5, further comprising:
    not marking the VoE traffic as discard eligible upon determining the first drop node contains the drop port.

7. The method of claim 1, wherein said network is an optical network.

8. The method of claim 7, wherein the optical network is a G.8032 protected optical network.

9. The method of claim 1, wherein the second control signal comprises control frames based on the standards of Y.1731 for Continuity Check Messages (CCM).

10. The method of claim 1, further comprising:
    receiving a third control signal from a second drop node in the network indicating the second drop node has a drop port configured to receive the VoE traffic; and
    transmitting the first control signal from the add node with a listener count of two.

11. The method of claim 10, further comprising:
    determining one of the first drop node, second drop node or other drop node is a last drop node with a drop port; and
    blocking the VoE traffic from passing to other nodes at the last drop node.

12. The method of claim 1, further comprising:
    blocking the VoE traffic from passing to other nodes at the first drop node.

13. The method of claim 1, wherein the first control signal from the add node comprises control frames based on the standards of Y.1731 for Continuity Check Messages (CCM).

14. A method for controlling the flow of video over Ethernet (VoE) traffic in a network, the method comprising:
    receiving the VoE traffic at a first drop node from an add node in the network;
    determining if the first drop node contains a drop port;
    transmitting a first control signal from the first drop node to the add node indicating the first drop node contains the drop port;
    receiving a second control signal from the add node with a listener count of one; and
    blocking the VoE traffic from passing to other nodes at the first drop node.

15. The method of claim 14, further comprising:
    receiving the second control signal from the add node with a listener count of two or more;
    determining that the first drop node is a last node with a drop port; and
    blocking the VoE traffic from passing to other nodes at the last node.

16. The method of claim 14, wherein the second control signal from the add node comprises control frames based on the standards of Y.1731 for Continuity Check Messages (CCM).

17. An apparatus for controlling the flow of video over Ethernet (VoE) traffic in a network, the method comprising:
    means for originating the VoE traffic from an add node in the network;
    means for transmitting a first control signal from the add node with a listener count of zero;
    means for receiving at the add node, a second control signal from a first drop node in the network containing a drop port configured to receive the VoE traffic;
    means for determining if the first drop node contains the drop port based on the second control signal; and
    upon determining that the first drop node contains the drop port, transmitting the first control signal from the add node with a listener count of one.

18. A non-transitory computer readable medium embodying computer executable instructions for controlling the flow of video over Ethernet (VoE) traffic in a network, the non-transitory computer readable comprising:
    instructions to receive the VoE traffic at a first drop node from an add node in the network;
    instructions to determine if the first drop node contains a drop port;
    instructions to transmit a first control signal from the first drop node to the add node indicating the first drop node contains the drop port;
    instructions to receive a second control signal from the add node with a listener count of one;

instructions to block the VoE traffic from passing to other nodes at the first drop node.

* * * * *